United States Patent [19]
Wolcott

[11] Patent Number: 5,149,998
[45] Date of Patent: Sep. 22, 1992

[54] EDDY CURRENT DRIVE DYNAMIC BRAKING SYSTEM FOR HEAT REDUCTION

[75] Inventor: John H. Wolcott, Racine, Wis.

[73] Assignee: Eaton Corporation, Cleveland, Ohio

[21] Appl. No.: 749,086

[22] Filed: Aug. 23, 1991

[51] Int. Cl.$^5$ .................... F16D 63/00; H02K 49/04; H02K 7/104

[52] U.S. Cl. .................................. 310/105; 188/267; 310/77; 318/758

[58] Field of Search ............... 188/158, 161, 267, 272; 310/77, 93, 105; 318/758, 765

[56] References Cited

U.S. PATENT DOCUMENTS

| | | | |
|---|---|---|---|
| 3,250,975 | 5/1966 | Pepper | 318/758 |
| 3,277,357 | 10/1966 | Willis | 310/77 |
| 5,054,587 | 10/1991 | Matsu et al. | 188/267 |
| 5,057,728 | 10/1991 | Dammeyer et al. | 310/77 |

Primary Examiner—R. Rudy
Assistant Examiner—D. L. Rebsh
Attorney, Agent, or Firm—L. H. Uthoff, Jr.

[57] ABSTRACT

A dynamic braking means for a variable speed dynamoelectric eddy current drive consists of an ac motor (4) rotationally coupled through a shaft (6) to an inductor drum assembly (13) of an eddy current coupling (3), where an annular field coil 12 generates an electromagnetic field which couples the inductor drum assembly to a pole assembly (10) which is rotationally coupled to an output shaft (16) which drives an inertial load (20). Upon command to stop and brake, a controller (30) signals a motor switch (26) to disconnect the ac motor from the ac source and connect it to a dc source, causing a braking torque to be produced. Concurrently, the controller signals a coupling switch (28) to go to an open position momentarily until the motor decelerates to approximately zero speed, whereupon the coupling switch is again closed, coupling the inertial load to the motor, thereby providing a braking action. The major portion of dissipated kinetic energy is thus shifted from motor to coupler, which has a higher heat capacity.

8 Claims, 1 Drawing Sheet

EDDY CURRENT DRIVE DYNAMIC BRAKING SYSTEM FOR HEAT REDUCTION

BACKGROUND OF THE INVENTION

This invention relates to electronic motor braking systems, and more particularly, to an electronic braking system which concentrates the absorption of the kinetic energy of an ac motor driven rotating mass in an eddy current coupling.

DESCRIPTION OF THE PRIOR ART

Electronic dynamic braking utilizing a direct current (dc) source for slowing down and stopping alternating current (ac) motors is well known in the motor art and is disclosed in U.S. Pat. Nos. 2,733,393 and 4,305,030, both of which are expressly incorporated herein by reference. A similar technology has been commercialized by Ambi-Tech Industries, Inc. wherein every time the ac motor is shut off, a dc voltage is applied to brake the motor until stopped. Also known, is using a mechanical brake employing friction surfaces to absorb the kinetic energy of a driven rotating mass by converting the kinetic energy into heat which is dissipated into the surrounding air or into a water cooling system.

Basically the prior art electronic dynamic motor braking system for a variable speed dynamoelectric machine employing an eddy current coupling uses the principle of removing the normal running ac electrical source from the motor and applying an amplitude and time controlled dc electrical source to the stator windings of the ac motor. The dc source produces a static, electromagnetic field across the stator which generates a force in the rotor of the motor to rapidly decelerate the motor and the driven inertial load without any mechanical friction braking. During this time the eddy current coupling remains energized and the kinetic energy is dissipated in the ac motor. The problem with this type of electronic dynamic braking has been the generation of heat in the dc energized stator windings of the ac motor which can result in damage and subsequent decreased life span due to the elevated internal temperatures experienced.

The friction based mechanical braking means eliminates the motor temperature rise difficulties, but requires additional mechanical and electronic parts, with a resulting increase in maintenance costs, and required packaging space.

BRIEF SUMMARY OF THE INVENTION

The present invention comprises a timed dynamic electronic braking system for a dynamoelectric machine where the eddy current coupling is disconnected from its associated source of electrical power and then a dc voltage braking current is converted to the ac drive motor for a determined amount of time after the motor is disconnected from the ac power source. Once the motor is decelerated to a substantially lower speed by the dc braking current, the eddy current coupling is reconnected to its electrical power source thereby creating a magnetic flux through an inductor drum and a rotor member thereby inducing a torque in the eddy current coupling which tends to resist relative rotation between these two elements, which couples the rotating inertia load to the stopped drive motor thereby effectuating a braking action. Due to the difference in rotational speed of the inductor drum and the rotor member, the major portion of the rotational kinetic energy is dissipated in the eddy current coupling as opposed to the ac drive motor. The eddy current coupling has higher thermal storage and heat dissipation capacity as compared to the ac drive motor, and thus, by using the eddy current coupling to absorb the rotational kinetic energy of the rotating members, the overall life of the drive system can be enhanced by lowering the thermal duty cycle of the ac drive motor. Also, since the thermal requirements of the drive motor have been reduced, a smaller and lower cost unit can be used.

A coupling switch means is used to connect or disconnect the eddy current coupling coil from an electrical power source and a motor switch means is used for disconnecting or connecting the drive motor to either an ac power source for normal running or a braking dc power source. Both of these switches are selectively activated by a control means so that the operation of the coupling switch and the motor switch is optimally coordinated for the braking function upon command.

A provision of the present invention is to provide a means to absorb the rotational kinetic energy of the eddy current drive device and the driven inertia load in the eddy current coupling so that the thermal input to the drive motor is minimized thereby extending its life.

DETAILED DESCRIPTION OF THE PREFERRED EMBODIMENT

Figure 1:
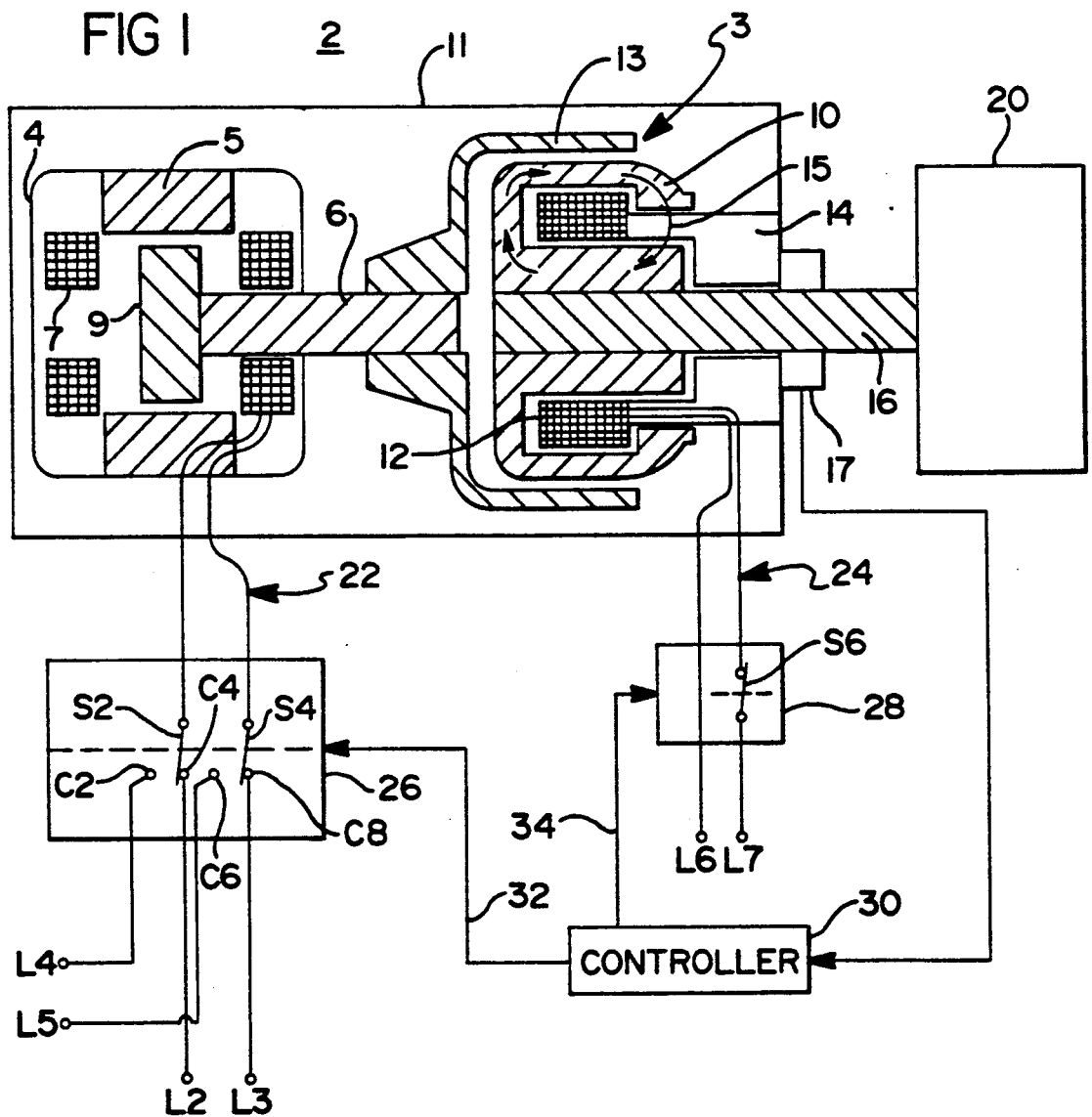
FIG. 1 is a cross-sectional view of an eddy current dynamoelectric drive with the electronic control circuitry of the present invention.

Referring to FIG. 1, a cross-section through a dynamoelectric eddy current drive 2 is shown. The eddy current drive 2 employs an electric drive motor 4 rotationally coupled via shaft member 6 to an eddy current coupling 3, which is rotationally coupled to an output shaft 16 contained in a single housing 11. The electric drive motor 4 is of a conventional ac type comprising a stator 5 and a rotor 9 which is secured to the shaft member 6. Both the stator 5 and the rotor 9 are of a laminated construction and electromagnetically interact with field windings 7 when supplied with an electrical current, either ac or dc. When the shaft member 6 is driven by the rotor 9, it is considered a power input shaft to the eddy current coupling 3, and the output shaft 16 is considered a power output shaft which is adapted to be connected to a driven inertial load 20.

Connected to the shaft member 6 for rotation therewith is an inductor drum assembly 13 which is composed of a ferro-magnetic material such as steel and which may have a substantially uniform magnetic reluctance. Connected to the output shaft 16 for rotation therewith, is a magnetic field pole assembly 10 which maintains a radial air gap or clearance between the inductor drum assembly 13 and the pole assembly 10 to provide for relative rotation therebetween. The pole assembly 10 surrounds an annular field coil 12 supported on a magnetic ring that serves as a coil support 14. The coil support 14 is connected to housing 11.

Energization of the field annular coil 12 establishes a flux path, represented by the arrows 15 in FIG. 1, which electro-magnetically couples the pole assembly 10 and the inductor drum assembly 13 so that rotation of the inductor drum assembly 13 by the shaft member 6 connected thereto will effect rotation of the pole assembly 10 and the output shaft 16 connected thereto. The magnitude of the energization of annular field coil 12 controls the relative speed, more commonly known as slip, between the pole assembly 10 and the inductor drum assembly 13 in a known manner.

During the operation of the eddy current coupling 3, the magnetic interaction between the pole assembly 10 and inductor drum assembly 13 results in the generation of eddy currents in the inductor drum assembly 13. These eddy currents produce a magnetic field which permits the transmission of torque from the inductor drum assembly 13 to the pole assembly 10 as discussed supra. Normally, a certain amount of "slip" occurs during the rotation of the inductor drum assembly 13 and the pole assembly 10 and such "slip", or difference in rotational speed generates heat in the inductor drum assembly 13, pole assembly 10, annular field coil 12 and coil support 14.

Eddy current drives having a variable output speed, as described supra, are well known in the prior art. Examples of such an eddy current drive are disclosed in U.S. Pat. Nos. 4,476,410 and 4,780,637, which are expressly incorporated herein by reference.

FIG. 1. further illustrates an example of an eddy current drive 2 in conjuction with the present invention to provide an effective method of braking the speed of rotation of the driven inertial load 20 upon command. In normal operation, the electric drive motor 4 is powered through the introduction of ac electrical energy through input lines L2 and L3 which is conducted through switches S2 and S4 respectively when in a closed state and into the motor power leads 22 which conduct the ac electrical energy into the electric drive motor 4. Also, electrical current is introduced into lines L6 and L7 and then is conducted through switch S6 when in a closed state and into the eddy current coupling 3 through electrical leads 24.

Motor switch 26 contains a plurality of contact points C2, C4, C6 and C8 where ac electrical power lines L2 and L3 are connected to electrical contacts C4 and C8 respectively, where switch S2 and switch S4, when in the position shown in FIG. 1, complete the electrical connection to the motor power leads 22, thereby providing the normal running ac electrical power to the drive motor 4. Also leading into the motor switch 26 are leads L4 and L5 which provide dc electrical current to contact points C2 and C6 respectively whereby, by the closing action of switch S2 and switch S4, leads L4 and L5 are connected to the motor power leads 22 thereby providing DC power to the drive motor 4. Also, by action of switches S2 and S4 in making contact with contact points C2 and C6, the electrical circuit connecting L2 and L3 to the motor power leads 22 is opened, thereby disconnecting the ac power. Upon connection of the dc power to the drive motor 4, the rotational speed of the motor 4 is decelerated by the generation of static dc electrical fields in the motor windings 7. The action of the motor switch 26 is controlled by a controller 30 which is also connected to the coupling switch 28.

Coupling switch 28, when in a closed state, functions to connect leads L6 and L7 to the coil leads 24 thereby providing electrical current to the annular field coil 12. The energized annular field coil 12 produces an electromagnetic field which travels through the coil support 14 into the rotating pole assembly 10 which is in close proximity to the coil support 14, thereby providing a path for the electromagnetic field to travel. In this manner the annular field coil 12 and coil support 14 can remain stationary to the housing 11. The electromagnetic field set up in the pole assembly 10 also travels into the inductor drum assembly 13 as indicated by arrows 15 where the eddy current coupling effect between the pole assembly 10 and the inductor drum assembly 13 determines the amount of torque transferred from the driven shaft 6 to the output shaft 16 and vise versa. The amount of energy dissipated as heat due to the relative motion (slip) between the inductor drum assembly 13 and the pole assembly 10 is proportional to the torque transferred and the relative rotational speed between the pole assembly 10 and the inductor drum assembly 13.

Located at the outer end of the housing 11 and circumferentially around the output shaft 16 is a tach generator 17 which supplies rotational speed information to the controller 30 which is used to make logic decisions relating to control of the motor 4 and the eddy current coupling 3 through positioning of the motor switch 26 and coupling switch 28 in response to signals from the controller 30.

Using the technique of the present invention, the motor 4 is operated in the normal mode with the leads L2 and L3 connected to the motor power leads 22 by way of switch S2 and switch S4 being in contact with contact C4 and contact C8, respectively, thereby supplying ac electrical power to the motor windings. Upon command from an operator to stop rotation and brake, the controller 30 activates the motor switch 26 so as to break contact between leads L2 and L3 and the motor power leads 22 by the opening of switch S2 and S4 thereby disconnecting ac power from the motor. At approximately the same time, coupling switch 28 is deactivated upon command from the controller 30 through line 34 and switch S6 is opened, thereby disconnecting the coil leads 24 from the source of electrical power supplied at leads L6 and L7. The electromagnetic field as indicated by arrows 15 collapses in the pole assembly 10 and a magnetic disconnection between the pole assembly 10 and the inductor drum assembly 13 occurs thereby magnetically disconnecting the motor 4 from the inertia load 20. Next, controller 30 signals the motor switch 26 by way of signal lead 32 to cause switch S2 and switch S4 to contact C2 and C6 thereby connecting leads L4 and L5 to the motor power leads 22 thereby supplying a dc current to the drive motor 4. The result is the deceleration of the rotation of motor 4 at a relatively rapid rate until the speed of the motor rotor 9 and shaft member 6 reaches approximately zero whereupon the controller signals the coupling switch 28 to reactivate and close switch S6. The coil leads 24 are reconnected to leads L6 and L7, thereby supplying electrical power to the annular field coil 12, and the magnetic field indicated by arrows 15 is re-established and the motor 4 is magnetically coupled to the driven inertial load 20. The drive motor rotor 9 and the inductor drum assembly 13 have been decelerated to approximately zero speed and the reactivation of the coupling switch 28 causes an electromagnetic field to be generated which flows through the pole assembly 10 into the inductor drum assembly 13 producing an eddy current induced coupling torque to the substantially stationary motor 4 via output shaft 16 and shaft member 6 which results in deceleration of the inertia load 20. An acceleration force generated in the motor 4 causes its speed to increase somewhat.

Figure 2:
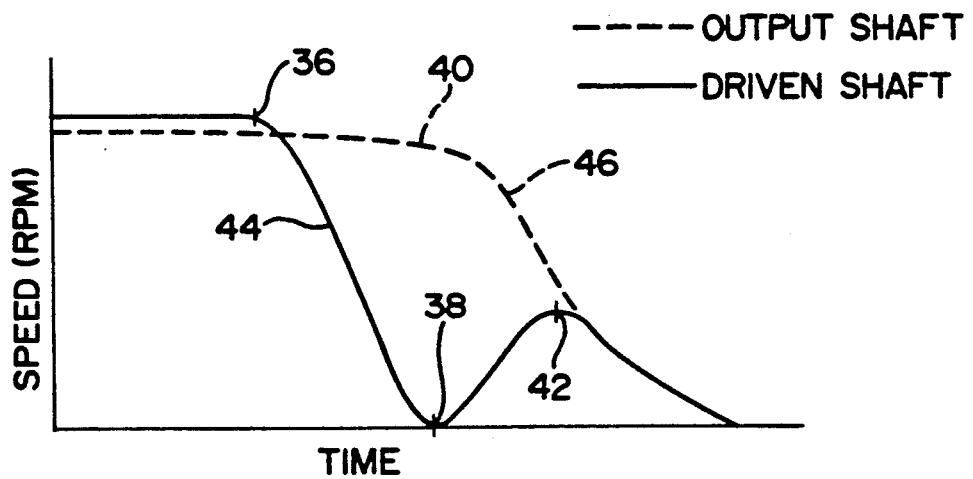
FIG. 2 is a rotational speed versus time diagram for the rotating members of the present invention.

The result is more clearly seen by way of FIG. 2 where the output shaft 16 speed and the driven shaft 6 speed is shown as a curve of speed in revolutions per minute versus time. Point 36 is the point in time where the eddy current coupling 3 is disconnected from electrical power by way of action of coupling switch 28 and concurrently the drive motor 4 is disconnected from the ac power source at leads L2 and L3 and switched over to the dc power source at leads L4 and L5 thereby resulting in a deceleration of the motor 4 to approximately zero as indicated as point 38 in the curve in FIG. 2. As the motor 4 speed approaches zero, the coupling switch 28 is reconnected as indicated at point 40, and the eddy current coupling 3 is re-energized thereby coupling the pole assembly 10 to the inductor drum assembly 13. The inductor drum assembly 13 is at approximately a zero speed, whereas the pole assembly 10 is rotationally connected to the inertia load 20 and is operating at a much higher speed. The electromagnetic coupling action between the inductor drum assembly 13 and the pole assembly 10 and the relative speed therebetween, results in a deceleration of the inertia load 20 and the production of the majority of the heat generated due to the conversion of the rotational kinetic energy of the inertia load 20 as it is decelerated is absorbed in the structure of the eddy current coupling 3 which dissipates into the surrounding air.

The advantage of the heat being generated in the eddy current coupling 3 (as opposed to the prior art where the energy was dissipated in the drive motor 4) is that the structure of the eddy current coupling 3 is much more conducive to the thermal dissipation and mechanical handling of high temperature. The result is that the life of the eddy current drive 2 is extended, package size is minimized and overall component cost is reduced.

What is disclosed is a new method of braking a dynamoelectric eddy current drive where the majority of the rotational energy of the inertia load is absorbed in the eddy current coupling rather than the drive motor. Since the thermal and mechanical characteristics of the eddy current coupling are much more conducive to the absorption of thermal energy, the result is an eddy current drive that exhibits a longer life, higher reliability and lower cost.

It will be appreciated by those of ordinary skill in the art that many variations in the foregoing preferred embodiment are possible while remaining within the scope of the present invention. The present invention should thus not be considered limited to the preferred embodiments of the specific choices of materials, configurations, dimensions, applications or ranges of parameters employed therein.

What is claimed is:

1. A dynamoelectric machine braking system for reduced drive motor heating comprising:

a dc power source for supplying dc electrical power;
an ac power source for supplying ac electrical power;
an ac electric drive motor having a motor output shaft and a motor coil electrically connected to said ac power source;
an eddy current coupling comprising, a rotor member rotatable about an axis of rotation, an inductor means drivingly attached to said motor output shaft and rotatable about said axis of rotation relative to said rotor member, a coupling coil means connected to said ac power source for producing an electromagnetic field thereby electromagnetically coupling said rotor member and said inductor means, an output shaft having a first end connected to said rotor member and a second end connectable to an inertial load whose motion is to be braked;
motor switch means for connecting said motor to said ac power source and for connecting said motor to said dc power source; and
control means for controlling the state of said motor switch means and for directing said ac power source to said coupling coil means when the amplitude of said ac power source directed to said coupling coil means is reduced to substantially zero thereby decoupling said rotor member from said inductor drum and when said control means directs said motor switch means to connect said motor coil to said dc power source until the rotational speed of said dc motor is substantially reduced in value, and wherein said control means increases the amplitude of said ac power source to said coil means to electromagnetically recouple said rotor member to said inductor drum thereby effectuating a braking action on said inertial load while dissipating an increased quantity of heat in said eddy current coupling.

2. The dynamoelectric machine braking system of claim 1, further comprising:

speed sensing means for measuring the rotational speed of said motor, said speed sensing means having an output signal connected to said control means.

3. The dynamoelectric machine braking system of claim 2, wherein said control means comprises a microprocessor having a control program residing therein; input electronic circuitry means for receiving said speed sensor output signal, and output electronic circuitry means for supplying said controlled source of ac power to said coil and for activating said motor switch means.

4. The dynamoelectric machine braking system of claim 1, wherein said motor switch means comprises a relay having a relay coil, said relay coil electrically connected to said control means and electrically energized in response to said control means, said relay having at least two sets of electrical contacts, said relay having a first condition where said first set of contacts complete an electrical path from said ac power source to said motor, and a second condition where said second set of contacts complete an electrical path from said dc power source to said motor.

5. The dynamoelectric machine braking system of claim 1, wherein said dc power source is created by rectifying said ac power source.

6. The dynamoelectric machine braking system of claim 1, wherein said motor switch means disconnects said motor from said dc power source when said motor attains a rotational speed of substantially zero.

7. A dynamoelectric machine and braking control therefore comprising:

an ac electrical power source;
a dc electrical power source;
an ac drive motor having a motor output shaft, said motor having at least one motor coil connectable to said ac electrical power source and said dc electrical power source;
switching means for controlling the application of said ac electrical power source to said motor coil and for controlling the application of said dc electrical power source to said motor coil;

an eddy current coupling comprising a rotatable input adapted to be driven by said motor, a rotatable output adapted to drive an inertial load, coupling coil means adapted to be connected to said ac electrical power source for producing an electromagnetic field to magnetically couple said input and said output; and control means for disconnecting said ac electrical power source from said motor field coil and from said coupling coil, and connecting said dc electrical power source to said motor coil to effectuate braking of said motor for a predetermined time whereupon said coupling coil means is reconnected to said controlled ac electrical power source to effectuate braking of said inertial load where the majority of the heat is generated in said eddy current coupling.

8. An improved method of braking a dynamoelectric machine of the type including, an ac electric drive motor having at least one motor coil connected to a source of ac electrical power, a rotating motor output shaft, and an eddy current coupling including a rotatable coupling input shaft adapted to be driven by said motor, a rotatable coupling output shaft adapted to drive an inertial load, coupling coil means adapted to be connected to said ac electrical power for producing an electromagnetic field to magnetically couple said coupling input shaft to said coupling output shaft, the improvement comprising:

disconnecting said coupling coil means from a source of ac electrical power;

disconnecting said drive motor from said ac electrical power;

connecting said drive motor to a source of dc electrical power to control the speed of rotation of said drive motor to a predetermined value; and connecting said coupling coil means to said source of ac electrical power to effectuate braking of said coupling output shaft and said inertial load.

* * * * *